No. 882,306. PATENTED MAR. 17, 1908.
G. FREDRICKSON.
FLY TRAP.
APPLICATION FILED DEC. 13, 1907.
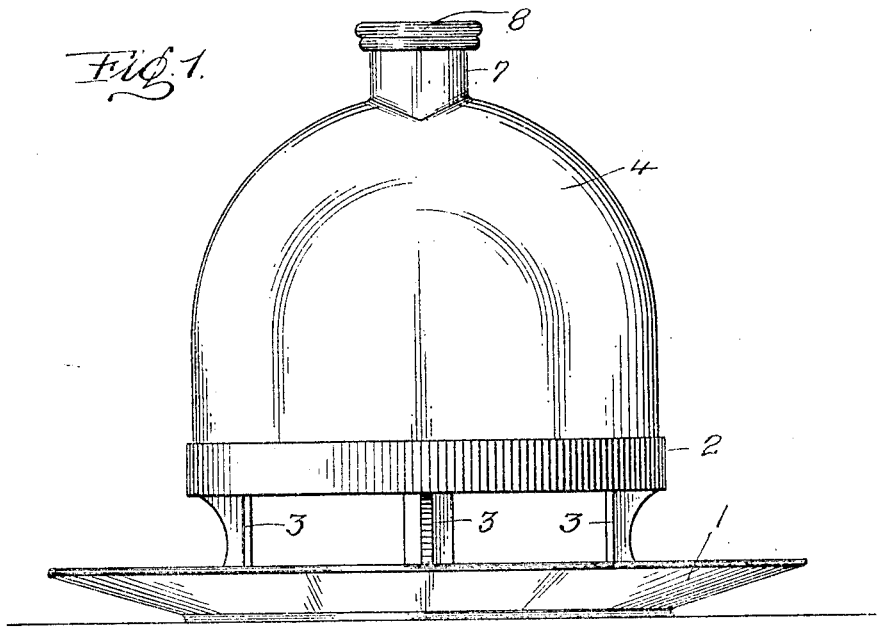
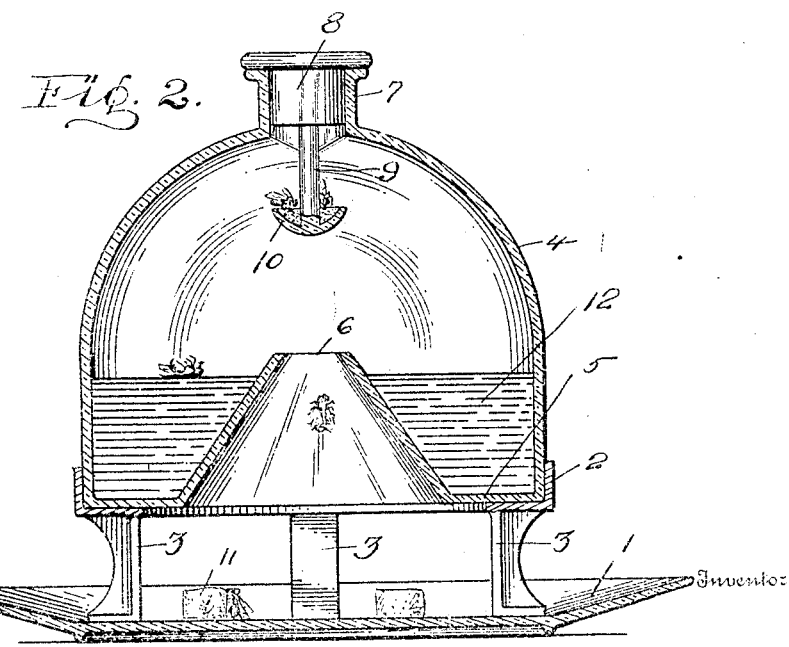

UNITED STATES PATENT OFFICE.

GUSTAFVA FREDRICKSON, OF PITTSBURG, PENNSYLVANIA.

FLY-TRAP.

No. 882,306.      Specification of Letters Patent.      Patented March 17, 1908.

Application filed December 13, 1907. Serial No. 406,295.

*To all whom it may concern:*

Be it known that I, GUSTAFVA FREDRICKSON, a citizen of the United States of America, residing at Pittsburg, in the county of Allegheny and State of Pennsylvania, have invented certain new and useful Improvements in Fly-Traps, of which the following is a specification, reference being had therein to the accompanying drawing.

This invention relates to fly traps, and the objects of the invention are, first, to provide a simple and inexpensive trap from which flies or winged insects cannot escape after entering the trap; second, to provide a simple and inexpensive trap to which flies can be easily attracted; and third, to provide a fly trap that can be easily and quickly cleaned and maintained in a sanitary condition. I attain these objects by a novel device that will be presently described and then specifically pointed out in the appended claims.

In the drawings: Figure 1 is an elevation of my fly trap, and Fig. 2 is a vertical sectional view of the same.

In the accompanying drawings, 1 designates a plate or saucer, and upon this plate or saucer is placed a flanged annulus or ring 2, supported by a plurality of legs 3. On the annulus or ring 2 is mounted a dome-like structure 4 having its base 5 provided with a central inwardly projecting frustrated cone-shaped mouth 6, this mouth extending to approximately the center of the dome-shaped structure 4.

The top of the structure 4 is provided with a flanged neck 7 to receive a stopper 8 having a depending stem 9. The lower end of the stem 9 carries a cup 10.

In practice I place sugar or some sweet substance 11 upon the plate or saucer 1, beneath the mouth 6, this substance attracting flies or winged insects. In the cup 10 I place sugar, honey, syrup or similar sweet substance, and the substance in the cup is adapted to attract flies into the dome-like structure 4. This dome-like structure is made of transparent material, as glass and is filled with a quantity of water or suitable liquid 12. The transparency of the structure deceives the flies therein, and when these insects strike the inner sides of the structure, they rebound into the water or liquid 12. The inner end of the mouth 6 is of a small diameter compared with the diameter of the structure, consequently a large area of water or liquid will be provided, and it will be practically impossible for the flies to escape through the mouth 6 upon once entering the dome-like structure. The support 8 can be easily removed, and the entire structure cleaned, and the sweet substance used renewed.

Having now described my invention what I claim as new, is:—

1. A fly trap embodying a plate, an annulus supported above said plate, a dome-like structure carried thereby and having its base provided with a frustrated cone-shaped mouth, a flanged neck carried by the top of said structure, a stopper fitting in said neck, a depending stem carried by said stopper and a cup carried by said stem, substantially as described.

2. A fly trap embodying a plate, an annulus supported above said plate, a dome-like structure supported by said annulus and adapted to contain a liquid, said structure having an inwardly extending frustrated cone-shaped mouth, a stopper mounted in the top of said structure, a depending cup supported by said stopper and adapted to contain a sweet substance.

3. A fly trap comprising a plate, an annulus supported above said plate, a dome-like structure supported by said annulus and adapted to contain a liquid, said structure having an inwardly projecting frustrated cone-shaped mouth, a stopper mounted in the top of said structure, and a cup suspended from said stopper.

4. In a fly trap, a supporting-annulus provided with an upwardly extending annular flange, supporting-legs for said annulus, a transparent dome-like structure supported on said annulus and having an upwardly-extending frusto-conical mouth rising centrally of the base of said structure, a stopper removably-mounted in the top of said structure, a depending stem carried by said stopper, and a cup carried on the lower end of said stem.

In testimony whereof I affix my signature in the presence of two witnesses.

GUSTAFVA FREDRICKSON.

Witnesses:
   MAX H. SROLOVITZ,
   C. V. BROOKS.